(No Model.)
W. E. CROCKETT & R. E. McADAMS.
ANIMAL TRAP.
No. 501,599. Patented July 18, 1893.
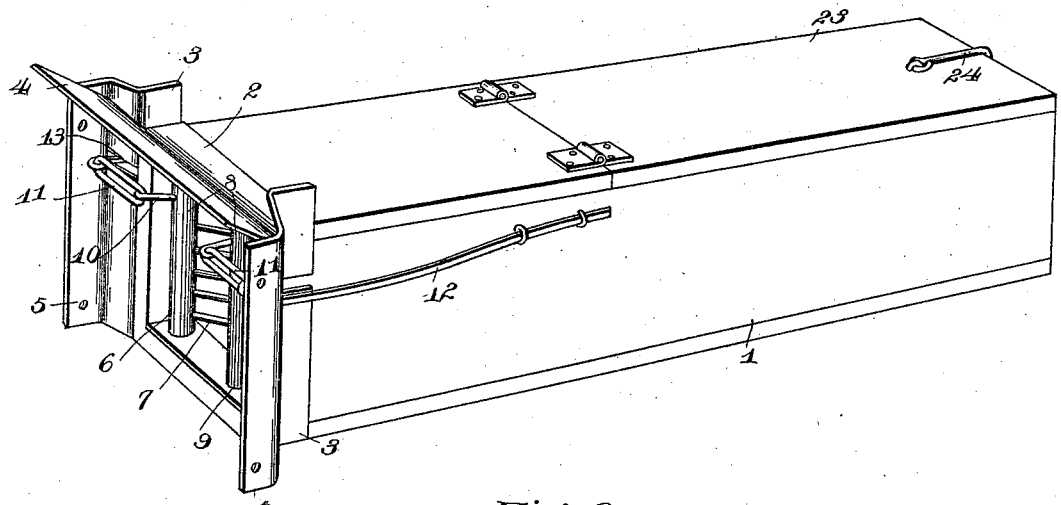
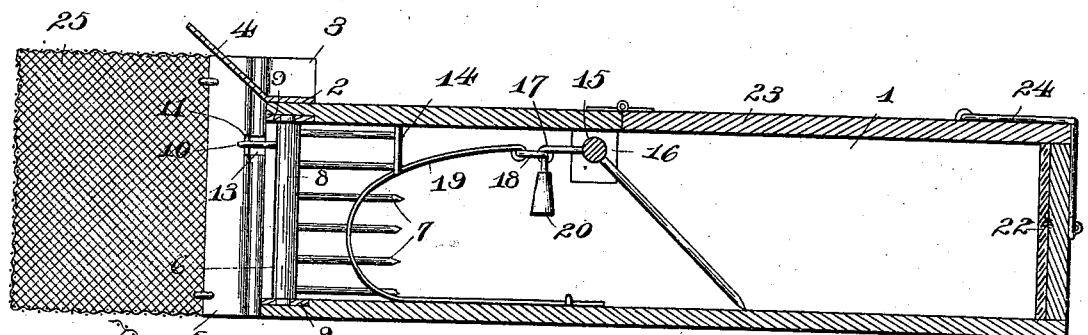
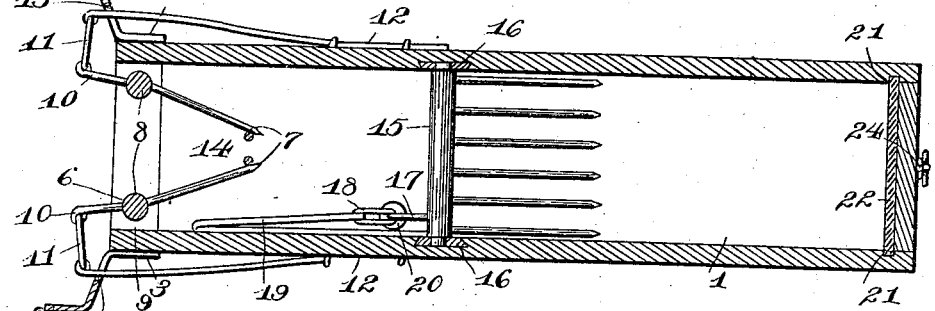
Witnesses
C. A. Ford.
N. W. Riley
Inventors
William E. Crockett,
& Richard E. McAdams
By their Attorneys,
C. A. Snow & Co.

UNITED STATES PATENT OFFICE.

WILLIAM E. CROCKETT AND RICHARD E. McADAMS, OF LAWS, TEXAS.

ANIMAL-TRAP.

SPECIFICATION forming part of Letters Patent No. 501,599, dated July 18, 1893.

Application filed March 14, 1893. Serial No. 465,928. (No model.)

*To all whom it may concern:*

Be it known that we, WILLIAM E. CROCKETT and RICHARD E. McADAMS, citizens of the United States, residing at Laws, in the county of Franklin and State of Texas, have invented a new and useful Animal-Trap, of which the following is a specification.

The invention relates to improvements in animal traps.

The object of the present invention is to improve the construction of animal traps, and to provide one adapted for catching a great variety of animals, such as game, and fish.

The invention consists in the construction and novel combination and arrangement of parts hereinafter fully described, illustrated in the accompanying drawings and pointed out in the claims hereto appended.

In the drawings—Figure 1 is a perspective view of a trap constructed in accordance with this invention. Fig. 2 is a vertical longitudinal sectional view. Fig. 3 is a horizontal sectional view.

Like numerals of reference indicate corresponding parts in all the figures of the drawings.

1 designates a box rectangular in cross-section and having its front end open and provided thereat with top and side plates 2 and 3 which have flaring flanges 4 and 5 forming an enlarged front or entrance to the trap. The box is provided at its front end with inwardly extending horizontally swinging doors 6, each of which consists of a series of pins or prongs 7 and a vertical pintle bar 8 journaled between horizontal cross-plates 9 arranged on the inner faces of the top and bottom of the box or receptacle 1. Each door is provided with an outwardly extending arm 10 projecting horizontally from the pintle bar at the top thereof, and connected by a link 11 with the front end of a horizontally disposed spring 12. The spring 12 is secured to the outer face of the adjacent side of the box or receptacle, and extends through a horizontal slot 13 of the adjacent side plate 3, and it serves to hold its door normally closed. The opposite doors 6 are prevented from closing entirely by stops 14 depending from the top of the box or receptacle, and holding the doors slightly open.

The box or receptacle is provided near its center with a depending door 15 constructed similarly to the doors 6, and having its pintle bar horizontally disposed and journaled in bearing plates 16. The door 15 is provided at one end of its pintle bar with a forwardly extending arm 17 which is connected by a link 18 with a spring 19 disposed at one side of the box or receptacle and arranged within the same; and a counterbalancing weight 20 is suspended from the arm of the door 15 to enable the latter to be readily opened from without to permit the passage of animals to the back of the box or receptacle.

At the rear end of the box or receptacle in opposite vertical grooves 21 is arranged a looking glass 22 adapted to attract animals and render them suspicionless. The glass may be removed, and the top is provided with a hinged door or section 22 which is locked by an L-shaped hasp 23 and which enables the trap to be readily emptied.

The trap is designed to be modified and adapted to the size and kind of animals to be caught, and when used for fish wings 24 are attached to the outer edges of the side plates 3. Each end of the box or receptacle may be provided with an entrance when designed for fish.

It will be seen that the trap is simple and comparatively inexpensive in construction, and that it is adapted for various kinds of animals.

Any suitable bait may be placed in the back of the trap behind the depending door 15.

We desire it to be understood that changes in the form, proportion and the minor details of construction may be resorted to without departing from the principle or sacrificing any of the advantages of this invention.

What we claim is—

1. A trap comprising a receptacle having an open front end, the top and side plates secured to the front of the receptacle and provided with flaring flanges, the side plates having horizontal slots in its flanges, the opposite horizontally swinging doors extending inward and having pintle bars provided with horizontally extending arms arranged opposite said slots, and springs secured to the sides of the receptacle and extending forward through said slots and connected with said arms, substantially as described.

2. A trap comprising a receptacle having an open front end, the top and side plates secured to the front of the receptacle and provided with flaring flanges, the side plates being provided with horizontal slots, the outwardly extending wings attached to the outer edges of the side plates, the opposite horizontally swinging doors extending inward into the receptacle and having vertical pintle bars and provided, opposite said slots, with outwardly extending arms, springs secured to the sides of the receptacle and extending forward through the slots, links connecting the arms with the front end of the springs, and the stops depending from the top of the receptacle and holding the doors slightly open, substantially as described.

3. A trap comprising a receptacle, the opposite inwardly extending doors arranged at the front of the receptacle, a depending door journaled between the sides of the casing and arranged near the center of the receptacle and inclining rearward and provided with a forwardly extending arm, a spring arranged at one side of the receptacle and connected with said arm, and a counterbalancing weight depending from the arm, substantially as and for the purpose described.

In testimony that we claim the foregoing as our own we have hereto affixed our signatures in the presence of two witnesses.

WILLIAM E. CROCKETT.
RICHARD E. McADAMS.

Witnesses:
T. W. RUSS,
M. G. McADAMS.